(Model.)

O. O. KITTLESON.
CHECK ROW LINE.

No. 316,792. Patented Apr. 28, 1885.

WITNESSES
Wm. B. Cummings
L. L. Miller

INVENTOR
Ole O. Kittleson,
per Chas. H. Fowler
Attorney

UNITED STATES PATENT OFFICE.

OLE O. KITTLESON, OF STERLING, ILLINOIS.

CHECK-ROW LINE.

SPECIFICATION forming part of Letters Patent No. 316,792, dated April 28, 1885.

Application filed August 29, 1884. (Model.)

*To all whom it may concern:*

Be it known that I, OLE O. KITTLESON, a citizen of the United States, residing at Sterling, in the county of Whiteside and State of Illinois, have invented certain new and useful Improvements in Check-Row Lines; and I do hereby declare that the following is a full, clear, and exact description of the same, reference being had to the annexed drawings, making a part of this specification, and to the letters and figures of reference marked thereon.

Figure 1:
Figure 2:

Figure 1 of the drawings is a plan view of my invention; Fig. 2, a side elevation thereof; and Fig. 3, a similar view, partly in section.

The present invention has relation to certain new and useful improvements in check-row lines for seed and corn plants, and has for its object to so connect the ends of the line to the button or stop as will admit the latter revolving on its axis in a direction longitudinally with the line to lessen the friction on the usual pulleys over which the line passes and render the stops thereon more effective. These objects I attain by the construction substantially as shown in the drawings, and hereinafter described and claimed.

Figure 3:

In the accompanying drawings, A, represents the stop, of any suitable material, but preferably of metal cast with a central circumferential groove; or, if desired, the stop can be formed with a shank or bar having buttons on its ends either cast therewith or formed separate, and afterward suitably connected thereto. The form of the stop A may be variously modified, so long as it will admit of turning on its axes in a direction lengthwise of the line to which it is connected. The line, which is preferably composed of wire sections B C, of suitable length, is connected to the stop A in the following manner: The ends of the wire sections are bent to form loops *a*, which are interlocked with each other, as shown in Fig. 3, and the looped ends passed around the shank *b* of the stop A, after which the ends *c* of the wire are coiled around the line to permanently form the loops.

When one or both of the sides or buttons of the stop are removably attached to the shank, the loops can be completed and passed over the shank, after which one or both of the sides or buttons may be secured in place.

The stops A are located upon the line suitable distances apart, and as they pass over the pulleys will turn or revolve upon their axis in a direction lengthwise or longitudinally with the check-row line, thus reducing the friction and rendering it more perfect in its action.

Having now fully described my invention, what I claim as new, and desire to secure by Letters Patent, is—

1. The combination, with a check-row line, of stops constructed and connected thereto, substantially as described, and adapted to revolve on their axes in a direction parallel with the line or lengthwise thereof, for the purpose set forth.

2. The combination, with stops consisting of shanks or bars provided with buttons at their ends, of a check-row line composed of wire sections having loops at their extremities through which the shank or bar of the stop passes at right angles or transversely to the length of the line, substantially as and for the purpose described.

3. In a check-row line, the combination, with the stops consisting of shanks or bars having buttons on their ends, of a line composed of wire sections formed with loops interlocking each other and passing over the bar or shank of the stops, substantially as and for the purpose specified.

In testimony that I claim the above I have hereunto subscribed my name in the presence of two witnesses.

OLE O. KITTLESON.

Witnesses:
R. K. SWIFT,
J. L. KITTLESON.